March 26, 1946.  K. F. HAYDEN ET AL  2,397,350
DRYING OF HYDROGELS
Filed Aug. 26, 1943   3 Sheets-Sheet 1
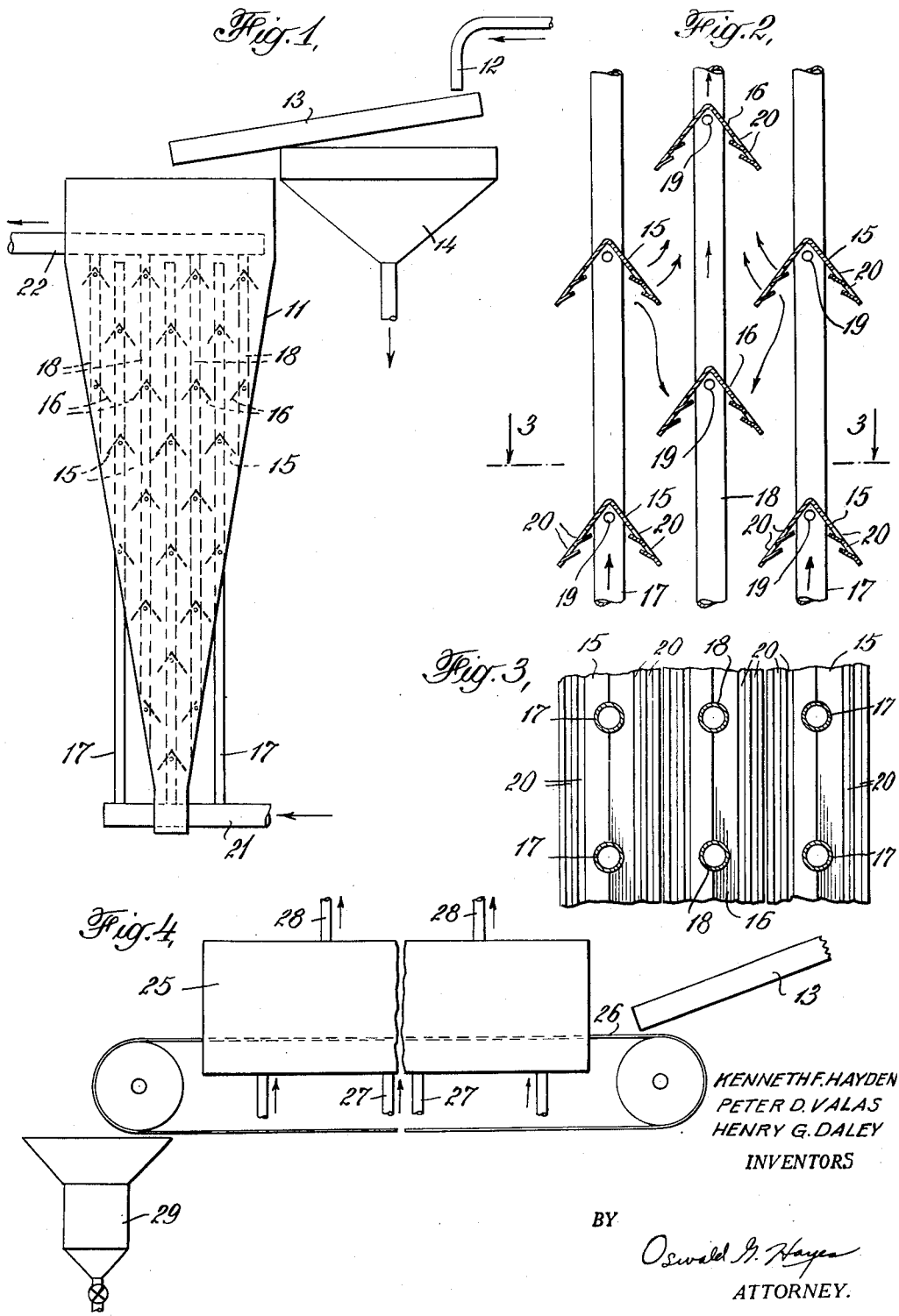
KENNETH F. HAYDEN
PETER D. VALAS
HENRY G. DALEY
INVENTORS
BY
Oswald G. Hayes
ATTORNEY.

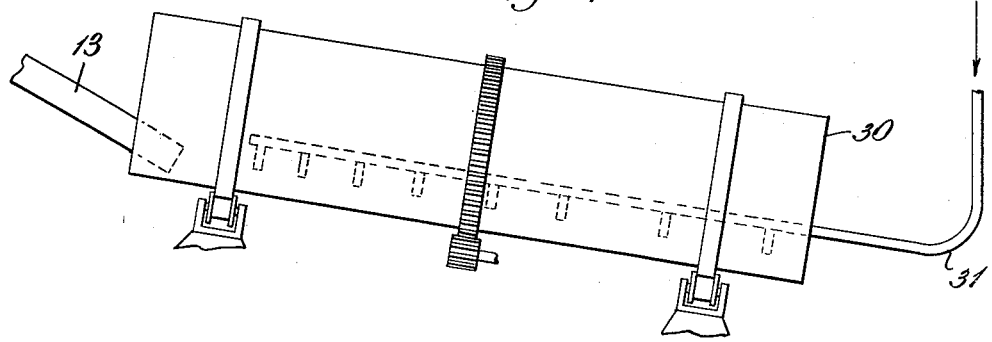
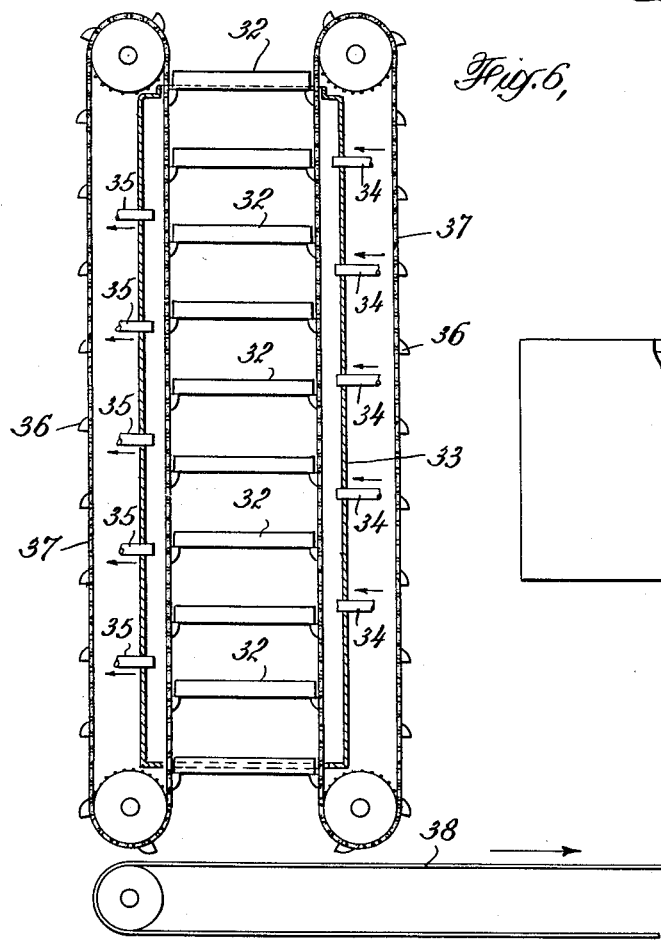
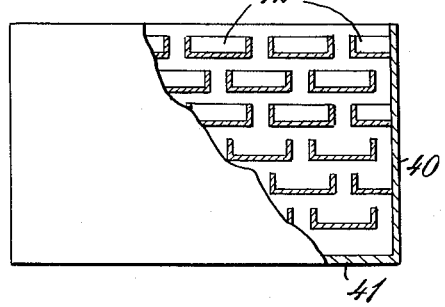

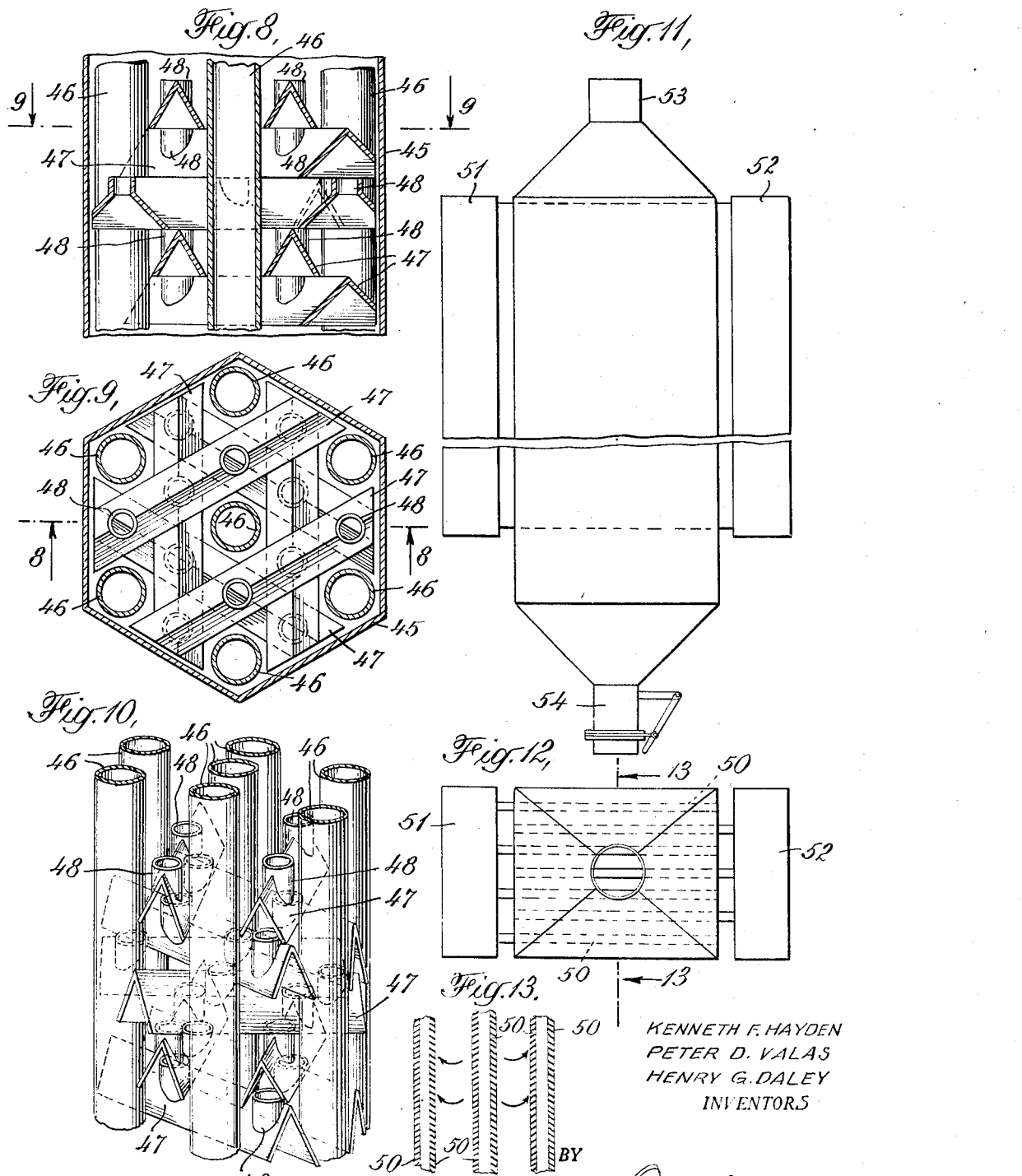

Patented Mar. 26, 1946

2,397,350

UNITED STATES PATENT OFFICE 2,397,350

DRYING OF HYDROGELS

Kenneth F. Hayden and Peter D. Valas, Woodbury, and Henry G. Daley, Woodbury Heights, N. J., assignors to Socony-Vacuum Oil Company, Incorporated, a corporation of New York Application August 26, 1943, Serial No. 500,120

13 Claims. (Cl. 252—317)

This invention relates to the drying of hydrogels and is particularly concerned with the problem of removing water from inorganic hydrogel particles where it is desired to retain the form of the particles.

In most processes involving preparation of inorganic gels, for example, silica-alumina hydrogels, for use as adsorbents, catalysts, catalyst carriers and the like, retention of form of hydrogel particles is immaterial or of minor importance. In typical manufacturing processes, a hydrogel or precipitate is formed, broken up, washed, dried and then placed in a desired form as by sizing broken lumps, pelleting or grinding. A recent important development in this field is the preparation of inorganic gels in "bead" form. This process involves extrusion of a sol having a relatively short gelation time into a body of an immiscible liquid, such as oil. The sol separates into globules and sets to a firm gel. Upon being dried—preferably after thorough washing to remove water-soluble matter—the globules shrink to hard glassy beads of generally spheroidal form. It is essential to the success of this process that the hydrogel globules retain their form until drying is substantially complete. It is found, however, that the hydrogel globules are very sensitive to damage. Due to the inherent elasticity of the hydrogel, globules will undergo minor shock without damage; but many types of drying induce breakage by crushing, attrition and other causes not understood. Fracture of the drying beads may produce losses well over 50% of the processed beads, utilizing drying techniques well adapted to drying of many fragile substances.

It has now been found that good yields of sound beads may be obtained by drying the hydrogel in a stream of gas. Even better results are realized when the gaseous stream is superheated steam. The use of superheated steam has been compared to other gaseous heating and drying media, with results uniformly favoring superheated steam. Parallel results cannot be obtained by using air, even at high humidity. Dry air and air containing upwards of 50% of moisture invariably cause high percentages of imperfect beads.

As a general indication of the influence of steam drying on yield, it may be noted that drying by the use of an air stream yields about 50% of sound beads, this generalization holding true for dry air and with moisture content well over 50%. Where the drying gas is superheated steam at substantially the same pressure yields of 90% or more sound beads are usual. An even more striking difference arising from the use of steam is correlated to heat treatment of the hydrogel globules before drying. In order to control density, the globules are "aged" before drying. This aging takes about 48 hours at 100° F. or 5 hours at 135° F. When air constitutes a substantial portion of the drying gas, the yield of sound beads is about 5% higher following the lower temperature treatment over the longer period. On the other hand, if steam is used for drying, no appreciable difference in yield is noted regardless of the type of treatment preceding drying, thus permitting a great saving in aging time without sacrifice of yield.

In general, the steam may be at temperatures on the order of about 215° to 350° F. and at atmospheric pressure. Steam up to 100 pounds per square inch pressure heated above saturation temperature may also be used to advantage. Steam is said to be superheated when it is at a temperature so that it possesses more than enough heat to maintain its existence as a dry gas at the given pressure. For best results, thicknesses of 2 to 4 inches of hydrogel are preferred in embodiments where the steam flows through the hydrogel mass as contrasted with certain embodiments where the steam contacts only a surface of a mass of particles.

Some dilution of the steam for drying is, of course, permissible within the bounds of the preferred embodiments of the invention. In general, the drying gas should be predominantly steam, say about 90% or more water vapor by volume.

The objects and advantages of the invention are further exemplified by the detailed discussion of the invention below, directed to use of certain preferred types of apparatus illustrated in the annexed drawings, wherein:

Figure 1 is an elevation of a vertical continuous treating column suited to the purposes of the invention;

Figure 2 is a detail view, illustrating the internal arrangement of elements in the column of Figure 1;

Figure 3 is a section on line 3—3 of Figure 2;

Figure 4 is illustrative of a tunnel oven type apparatus;

Figure 5 shows a rotary kiln adapted to the invention;

Figure 6 is a vertical sectional view of a continuous tray dryer;

Figure 7 shows a tray designed particularly for use in drying hydrogel globules;

Figure 8 is a vertical section showing another internal arrangement of elements in a vertical treating column;

Figure 9 is a section on line 9—9 of Figure 8;

Figure 10 is a perspective view of the arrangement shown in Figures 8 and 9;

Figure 11 is a diagrammatic showing of a further type of drying equipment;

Figure 12 is a plan view thereof; and

Figure 13 is a partial section on line 13—13 of Figure 12.

It is a pronounced feature of the present process that the hydrogel, on drying, shrinks to a considerable extent. In general, the dried beads are on the order of one-fifteenth of the volume of the hydrogel globules from which they are prepared. Some of the equipment illustrated in the drawings takes advantage of this quality.

In Figure 1 is illustrated a vertical drying tower 11 adapted for substantially uniform flow of the beads downward during the drying operation. As shown, the tower is tapered toward the bottom in order to compensate for the shrinkage of the beads as drying proceeds. Hydrogel globules are conveyed to the dryer in a stream of water by pipe 12 which discharges into an inclined trough 13 formed of porous material, for example, cheese cloth suitably reinforced by metallic supporting elements. As the beads pass down the trough, the water flows through the trough walls and this drainage may be advantageously augmented by a blast of air applied to the globules from above. The water falls into a drainage hopper 14 which is in contact with the lower side of the trough to prevent a stream of water flowing along the under side of the trough to the tower 11.

Within the tower 11, there are suitable means for causing passage of a stream of drying gas through the hydrogel to be dried. In the embodiment shown here, this is accomplished by the use of inlet louvres 15 and outlet louvres 16 disposed through the tower and conduits 17 and 18 communicating with the louvres. As illustrated in Figures 2 and 3, the louvres 15 and 16 are constituted by angle irons through which the conduits 17 and 18 pass. Orifices 19 in the conduits 17 and 18 provide for supplying drying gases to inlet louvres 15 and withdrawing gases from outlet louvres 16. In addition to functioning as inlets and outlets for drying gases, the louvres furnish partial support at spaced intervals for the hydrogel, which is structurally weak but becomes stronger and harder as drying proceeds. The louvres thus relieve the column of drying globules of a portion of the weight of the globules higher in the column.

The angle of the louvres is not critical but the slope should not be so steep as to eliminate the feature of partial support nor so shallow that a substantial proportion of the globules are retained thereon. In general, an angle of about 45 degrees is quite satisfactory. Along the length of each louvre and parallel to the edges thereof are one or more slots 20 to aid in flow of gases between the space below the louvre and the mass of globules. Sharp edges and rough surfaces are preferably avoided since these tend to mar the surfaces of the globules before those surfaces are hardened by drying. Gaseous drying medium is admitted to the inlet conduits 17 from a plurality of headers 21 and withdrawn from conduits 18 by a plurality of headers 22.

Continuous type drying may also be practiced in apparatus of the types shown in Figures 4, 5 and 6. Figure 4 illustrates diagrammatically a continuous belt dryer comprising an elongated chamber 25 through which passes a porous belt 26. Hydrogel globules are supplied by a trough 13, similar to that of Figure 1, and the dried beads are dropped from the end of belt 26 to a hopper 29. Drying gas is supplied by inlets 27 and exhaust withdrawn by pipes 28 from the drying chamber. A particularly advantageous feature of this type of apparatus is that it permits of employing different drying and/or treating conditions during different stages of the operation. Partitions or curtains at right angles to the belt 26 having openings no larger than necessary to accommodate the belt and its load provide, in effect, a plurality of treating zones substantially isolated from each other.

The operation of the rotary kiln 30 of Figure 5 is similar to that of such kilns when used for other purposes. Superheated steam or other suitable gaseous drying medium is admitted by pipes 31 and may be withdrawn from spaced points in the kiln or allowed to pass out the upper end of the kiln as desired.

A continuous tray dryer is shown in Figure 6. A plurality of trays 32 are each filled with hydrogel globules and passed vertically through a drying chamber 33 having a plurality of inlets 34 and outlets 35. According to the embodiment shown, the trays 32 are supported and conveyed through the chamber by lugs 36 on two endless conveyors 37, one on each side of the chamber. In order to make handling of the trays easier, the direction of travel through chamber 33 is preferably downward. Trays are placed in the top of the chamber to rest on lugs 36 and upon reaching the bottom with dried beads, they are dropped to a conveyor 38 which transfers them for further treatment. For example, the beads may be carried by conveyor 38 through a tunnel oven similar to that of Figure 4 for the heat treatment conventional in preparation of catalysts for cracking of petroleum distillates.

The trays 32 may be simple flat trays having porous walls or they may embody the novel basket design illustrated in Figure 7. This basket is particularly adapted to use in drying of bead catalyst and other materials requiring partial support during treatment. The basket is defined by perforate or porous walls 40 and bottom 41, and contains a plurality of small trough-like trays 42 also defined by perforate or porous walls. The basket is filled by running in a stream of water carrying gel globules while the basket itself is immersed in water. This operation may be performed before the globules are washed and the basket used both for washing and for drying of the gel particles. During such filling, the gel flows between adjacent trays 42 of one level to fill a tray of the next lower level and overflow each side thereof to the trays of the next successive level. The basket is thus filled, leaving longitudinal channels—one under each tray—to a substantial depth, while the globules on the bottom are not subjected to the full weight of the globules above. As drying proceeds, the individual globules shrink in size and at the conclusion of the drying period it is found that all the beads are either in the trays 42 or on the bottom of the basket.

Such a basket can also be used in a tunnel oven type of dryer, either by resting the basket on a belt 26 as shown in Figure 4, or by suspending the basket from an overhead conveyor. Simple trays, such as those in Figure 6, can obviously be handled in the same manner. Alternately, simple trays or baskets as shown in Figure 7 may be used in a batch type dryer, wherein the container (either basket or tray) is inserted into an oven where drying gas is passed through a single container or a plurality of containers in parallel or series.

When dried in a static bed, adequacy of contact of drying gas with hydrogel appears to be a critical factor in drying time. Heat exchange between gases and hydrogel is so efficient that the gel dries in thin layers beginning at the surface of entry of the gas into a bed of hydrogel and progressing as the gel dries in each layer. For example, using superheated steam at atmospheric pressure and 215–350° F., the drying time for a bed of hydrogel is about thirty minutes per inch of bed dimension in the direction of gas flow. The drying time varies with the rate of gas flow and degree of super heat.

A further type of continuous dryer is illustrated in Figures 8, 9 and 10. The principal feature of this type of apparatus is the formation in a body of moving hydrogel of a plurality of channels, each of which is utilized as a path for drying gases passes in contact with the hydrogen without flowing through any substantial depth of gel particles. This result is accomplished by passing the hydrogel downwardly through a vertical elongated chamber as a substantially continuous mass while baffling the particles to form continuous gas paths therethrough. The drying gas is passed through these continuous paths whereby it is caused to contact surfaces exposed to the gas paths without passing through any substantial depth of hydrogel in the apparatus. Different types of apparatus for so contacting a gas and a solid are described in U. S. Patent No. 2,227,416, issued December 31, 1940, on an application of John W. Payne. Figures 8, 9, and 10 hereof disclose one of the forms described in said patent and from the discussion below of the single form shown in this application, it will be readily apparent to those skilled in the art how all the modifications of that patent may be adapted to the purposes of this invention.

In the apparatus of Figures 8 to 10, inclusive, an elongated vertical drying chamber is defined by a wall 45 and is fitted internally with heat exchange tubes 46 and baffles 47, the latter being essentially in the form of angle irons disposed with the heel up. The baffles 47 of successive courses at different levels are disposed at an angle to those of the course next above and the course next below. In the embodiment shown, this angle is 60 degrees, every third course being parallel to the same vertical plane. The baffles are pierced at intervals along their lengths to provide orifices 48 which prevent concentration of the gas flow at the ends of the baffles. Each of the orifices is disposed below an unpierced portion of the baffle next above, thus causing the gas flow path to be tortuous. A heat exchange medium is circulated through heat exchange tubes 46 to provide the latent heat of evaporation and maintain the drying gas at proper temperature. It is generally advisable to bleed off a portion of the gas at different levels in the column and this may be accomplished by providing outlets from each baffle of a course to a suitable manifold. In many instances, it is found helpful to replace the drying gas at intervals in the column, as by providing a course of blind baffles having no orifices 48. Gases may be withdrawn to a manifold from the blind course and fresh gases supplied to the course next above. Where superheated steam is the drying agent, a portion of the steam withdrawn from a blind course of baffles may be superheated and returned to the next higher course. In such cases, the heat exchange tubes 46 may be eliminated in order to increase capacity of the unit.

According to the embodiment of Figures 11 to 13, the hydrogel is dried during passage between steam inlet and outlet means, somewhat similarly to Figure 1. The inlet and outlet means are in the nature of perforate parallel walls 50. One pair of walls 50 defines an inlet for drying medium supplied from a box-like header 51, while adjacent pairs of walls 50 define outlets discharging to box-like header 52. The hydrogen enters from a conduit 53 and dried particles are discharged at 54.

We claim:

1. A process for drying inorganic hydrogen particles which have not previously been converted from the jelly state by drying to hard porous gel, which process comprises passing superheated steam at about 215° F. to about 350° F. in contact with said particles.

2. A process for drying inorganic hydrogen particles which have not previously been converted from the jelly state by drying to hard porous gel, which process comprises passing superheated steam at about 215° F. to about 350° F. in contact with said particles disposed in a deep bed and effecting partial support of the particles at regions intermediate the upper and lower extremities of said bed whereby the crushing force of the weight of particles in the upper part of said bed is substantially relieved.

3. A process for drying inorganic hydrogel particles which have not previously been converted from the jelly state by drying to hard porous gel, which process comprises passing steam at substantially atmospheric pressure and a temperature of about 215° to 350° F. in contact with said particles.

4. A process for drying inorganic hydrogel particles which have not previously been converted from the jelly state by drying to hard porous gel, which process comprises passing steam at substantially atmospheric pressure and a temperature of about 215° to 350° F. in contact with said particles disposed in a deep bed and effecting partial support of the particles at regions intermediate the upper and lower extremities of said bed whereby the crushing force of the weight of particles in the upper part of said bed is substantially relieved.

5. A process for drying inorganic hydrogel particles which comprises continuously passing said particles downwardly through a drying zone, baffling said particles during passage thereof through said zone to provide a plurality of substantially continuous, substantially particle-free paths through the particles in said zone and passing steam at substantially atmospheric pressure and a temperature of about 215° to 350° F. through said paths.

6. A process for drying inorganic hydrogel particles which comprises disposing said particles in a bed of two to four inches in depth and flowing superheated steam at about 215° F. to about 350° F. through said bed.

7. A process for drying inorganic hydrogel particles which comprises passing a gas containing at least about 90% by volume of superheated steam at a temperature of about 215° to about 350° F. in contact with said particles.

8. A process for drying inorganic hydrogel particles which comprises passing a gas containing at least about 90% by volume of superheated steam at a temperature of about 215° to about 350° F. and substantially atmospheric pressure in contact with said particles.

9. A process for manufacture of inorganic oxide gel in the form of hard glassy spheroidal particles which comprises causing gelation of globules of inorganic oxide hydrosol in a body of a water-immiscible liquid, washing the resultant spheroidal particles of hydrogel to remove water soluble matter therefrom and thereafter drying said hydrogel particles to remove the liquid phase therefrom by passing superheated steam at about 215° F. to about 350° F. in contact with the washed hydrogel particles whereby the liquid phase of the hydrogel is substantially removed while retaining said spheroidal shape of said particles.

10. A process for manufacture of inorganic oxide gel in the form of hard glassy spheroidal particles which comprises causing gelation of globules of inorganic oxide hydrosol in a body of a water-immiscible liquid, washing the resultant spheroidal particles of hydrogel to remove water soluble matter therefrom and thereafter drying said hydrogel particles to remove the liquid phase therefrom by passing superheated steam at substantially atmospheric pressure and a temperature of about 215° to about 350° F. in contact with the washed hydrogel particles whereby the liquid phase of the hydrogel is substantially removed while retaining said spheroidal shape of said particles.

11. A process for manufacture of inorganic oxide gel in the form of hard glassy spheroidal particles which comprises causing gelation of globules of inorganic oxide hydrosol in a body of a water-immiscible liquid, washing the resultant spheroidal particles of hydrogel to remove water soluble matter therefrom and thereafter drying said hydrogel particles to remove the liquid phase therefrom by passing a gaseous drying agent containing at least about 90% by volume of superheated steam at a temperature of about 215° to about 350° F. in contact with the washed hydrogel particles whereby the liquid phase of the hydrogel is substantially removed while retaining said spheroidal shape of said particles.

12. A process for manufacture of inorganic oxide gel in the form of hard glassy spheroidal particles which comprises causing gelation of globules of inorganic oxide hydrosol in a body of a water-immiscible liquid, washing the resultant spheroidal particles of hydrogel to remove water soluble matter therefrom, aging the particles of hydrogel at about 135° F. for about five hours and thereafter drying said hydrogel particles to remove the liquid phase therefrom by passing superheated steam at about 215° F. to about 350° F. in contact with the washed and aged hydrogel particles whereby the liquid phase of the hydrogel is substantially removed while retaining said spheroidal shape of said particles.

13. A process for manufacture of inorganic oxide gel in the form of hard glassy spheroidal particles which comprises causing gelation of globules of inorganic oxide hydrosol in a body of a water-immiscible liquid, washing the resultant spheroidal particles of hydrogel to remove water soluble matter therefrom, aging the particles of hydrogel at about 135° F. for about five hours and thereafter drying said hydrogel particles to remove the liquid phase therefrom by passing a gaseous drying agent containing at least about 90% by volume of superheated steam at a temperature of about 215° to about 350° F. in contact with the washed and aged hydrogel particles whereby the liquid phase of the hydrogel is substantially removed while retaining said spheroidal shape of said particles.

KENNETH F. HAYDEN.
PETER D. VALAS.
HENRY G. DALEY.

---

Certificate of Correction

Patent No. 2,397,350.   March 26, 1946.

KENNETH F. HAYDEN ET AL.

It is hereby certified that errors appear in the printed specification of the above numbered patent requiring correction as follows: Page 3, first column, line 27, for "passes" read *passing*; same line for "hydrogen" read *hydrogel*; and second column, lines 16, 20 and 26, for "hydrogen" read *hydrogel*; and that the said Letters Patent should be read with these corrections therein that the same may conform to the record of the case in the Patent Office.

Signed and sealed this 28th day of May, A. D. 1946.

[SEAL]

LESLIE FRAZER,
*First Assistant Commissioner of Patents.*